Patented Aug. 10, 1926.

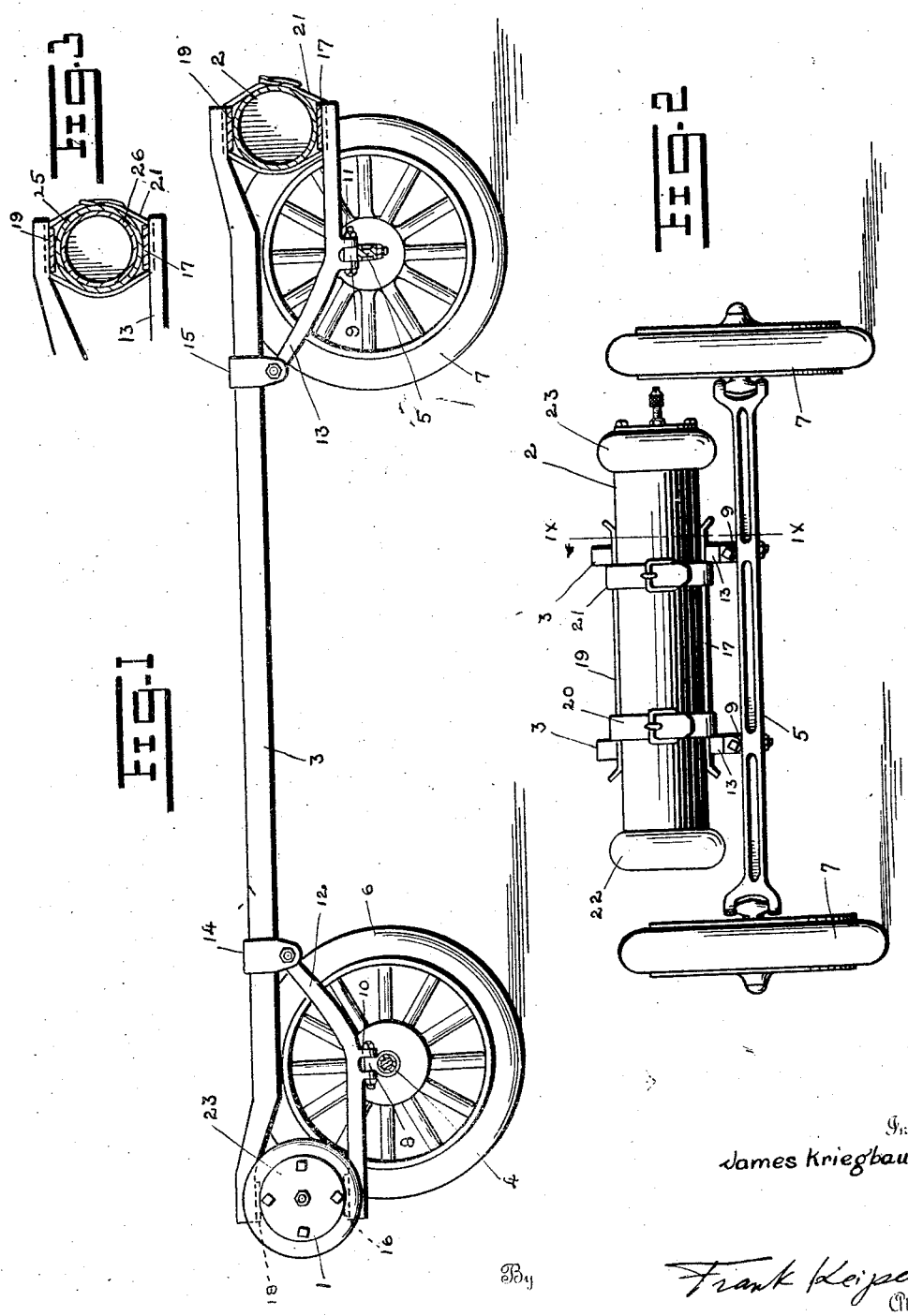

1,595,233

UNITED STATES PATENT OFFICE.

JAMES KRIEGBAUM, OF HUNTINGTON, INDIANA.

PNEUMATIC SUSPENSION FOR VEHICLE CHASSIS.

Application filed July 22, 1924. Serial No. 727,595.

The object of this invention is to provide a new and improved method and means for pneumatically suspending or supporting the chassis of a vehicle in order to absorb the shocks transmitted to the chassis and caused by the unevenness in the road over which the vehicle travels.

This and other objects of this invention will be fully illustrated in the drawing, described in the specification and pointed out in the claims at the end thereof.

In the accompanying drawing:

Figure 1 is a longitudinal sectional view of a chassis equipped with the improved pneumatic suspension, the section being taken on the line $1^x$—$1^x$ of Figure 2.

Figure 2 is a front elevation of the chassis and its suspension.

Figure 3 is a detail sectional view of a modified form of one of the air cushions.

In the figures of the drawing like reference numerals indicate like parts.

The pneumatic suspension forming the subject matter of this invention is intended to primarily absorb and cushion the jars caused by the wheels and axles of a vehicle when traveling over an uneven road surface. Such jars cannot, therefore, be transmitted to the chassis or frame of the vehicle on which the body is suspended making traveling in the vehicle safer and much more comfortable when driving at either a low or a high rate of speed.

The pneumatic suspension comprises a pair of air cushions 1 and 2 in the form of elongated cylindrical air bags. These air cushions are located one at the front and one at the rear of the chassis 3 of the vehicle and extend transversely of the chassis to evenly support it on the axles 4 and 5 and in turn on the wheels 6, 6 and 7, 7 respectively. Each axle has a pair of perches 8, 8 and 9, 9 mounted thereon that engage and are pivoted in the forked seats 10, 10 and 11, 11 provided on the under side of the levers 12 and 13. The inner ends of the levers 12 and 13 are pivoted on the brackets 14 and 15 carried on the chassis 3 while the outer ends thereof have the pressure plates 16 and 17 respectively supported thereon.

The outer ends of the chassis 3 carry similar pressure plates 18 and 19 on the under side thereof. The air cushions 1 and 2 are placed between the pressure plates 17 and 19 at the front of the chassis and between the pressure plates 16 and 18 at the rear of the chassis. A pair of straps 20 and 21 encircle the air bags and the pressure bars at the top and bottom thereof and hold these air bags in place between the outer end of the chassis and the outer ends of the levers 12 and 13. These straps also serve to arrest the rebound of the chassis after it has been cushioned by the air bags.

The air bags 1 and 2 may be of any suitable material that will hold air and will not rupture easily on the compression thereof. The ends of the air bags may be closed by the heads 22 and 23 one of which is provided with an inlet tube and valve thru which the air bag can conveniently be inflated.

It will be readily seen that the chassis of a vehicle constructed in the manner above described and illustrated in the drawing is subjected to very little jar because as the wheels travel over a bump, a quick upward movement of the wheels is communicated thru the axle to the levers 12 and 13, but as these levers are forced upwardly and rocked on their inner pivoted ends in consequence thereof, the outer ends thereof compress the air bags between the outer ends of the levers and the outer ends of the chassis. In compressing the air bags the jar that has caused the compression is practically absorbed and very little if any of the jar is communicated or transmitted to the chassis 3. This makes riding in a vehicle suspended in the manner above described comfortable and safe in that it absorbs the road shocks and eliminates undue swaying and bouncing of the vehicle due to the unevenness of the road.

The air cushions may be made up in the form of a pneumatic tire comprising an outer casing 25 and an inner tube 26. This is illustrated in section of Figure 3 This construction will allow a replacement of the inner tube when it begins to leak while the outer casing is still serviceable.

I claim:

In a vehicle chassis, the combination of a front and a rear axle, a chassis frame, rigid levers pivotally mounted near the front and back of said frame on each side thereof, said front and said rear axle being attached to said levers at an intermediate point thereof, a cylindrical air cushion interposed between the outer ends of said levers and the outer ends of said chassis frame, pressure plates connecting the outer ends of said chassis frame and the outer ends of said rigid levers above and below said air cushions and straps surrounding said air cushions and said pressure plates to hold said air cushion in place between the ends of said levers and the ends of said chassis frame.

In testimony whereof I affix my signature.

JAMES KRIEGBAUM.